United States Patent
Kofler et al.

(10) Patent No.: US 6,353,595 B1
(45) Date of Patent: Mar. 5, 2002

(54) METHOD AND CONFIGURATION FOR THE NETWORK-WIDE ANALYSIS OF CONNECTIONS IN TELECOMMUNICATIONS NETWORKS

(75) Inventors: Christian Kofler; Ludger Tappert, both of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/436,476

(22) Filed: Nov. 8, 1999

Related U.S. Application Data

(63) Continuation of application No. PCT/DE98/01110, filed on Apr. 21, 1998.

(51) Int. Cl.[7] ............................................. H04M 3/22
(52) U.S. Cl. ...................... 370/244; 370/250; 370/252
(58) Field of Search ................................ 370/251, 252, 370/243, 244, 246–250, 255

(56) References Cited

U.S. PATENT DOCUMENTS

| | | | |
|---|---|---|---|
| 5,430,708 A | | 7/1995 | Fukuda et al. |
| 6,046,985 A | * | 4/2000 | Aldred et al. ............... 370/252 |

FOREIGN PATENT DOCUMENTS

| | | |
|---|---|---|
| EP | 0589248 A2 | 3/1994 |
| EP | 0661859 A2 | 7/1995 |
| WO | WO 98/09420 | 3/1998 |

OTHER PUBLICATIONS

"ISDN–PAS: An ISDN Performance Analysis System", proceedings of the region 10 conference on computer and communication systems (TENCON), Hong Kong, Nov. 1990, vol. 2, pp. 865–868, Sep. 1990.

"Hewlett Packard: HP Open View, NM Server Technical Evaluation Guide", U.S.A., 1989, pp. 5952–1125.

* cited by examiner

Primary Examiner—Melvin Marcelo
(74) Attorney, Agent, or Firm—Herbert L. Lerner; Laurence A. Greenberg; Werner H. Stemer

(57) ABSTRACT

A method and a configuration for the network-wide analysis of connections in telecommunications networks. Here, a connection line from a point A to a point B of the network via at least one node of the network is provided. An interrogation instruction is transferred from an interrogation point of the network to the at least one node. In response to the interrogation instruction from the interrogation point of the network, connection data relating to the at least one node of the network are then transferred from the at least one node of the network to a receiver point of the network.

20 Claims, 1 Drawing Sheet

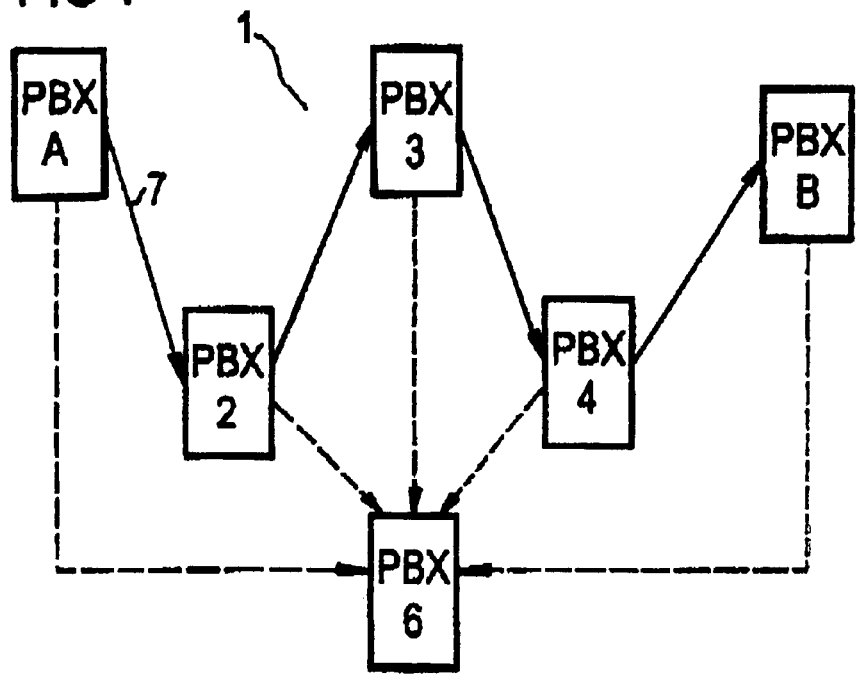
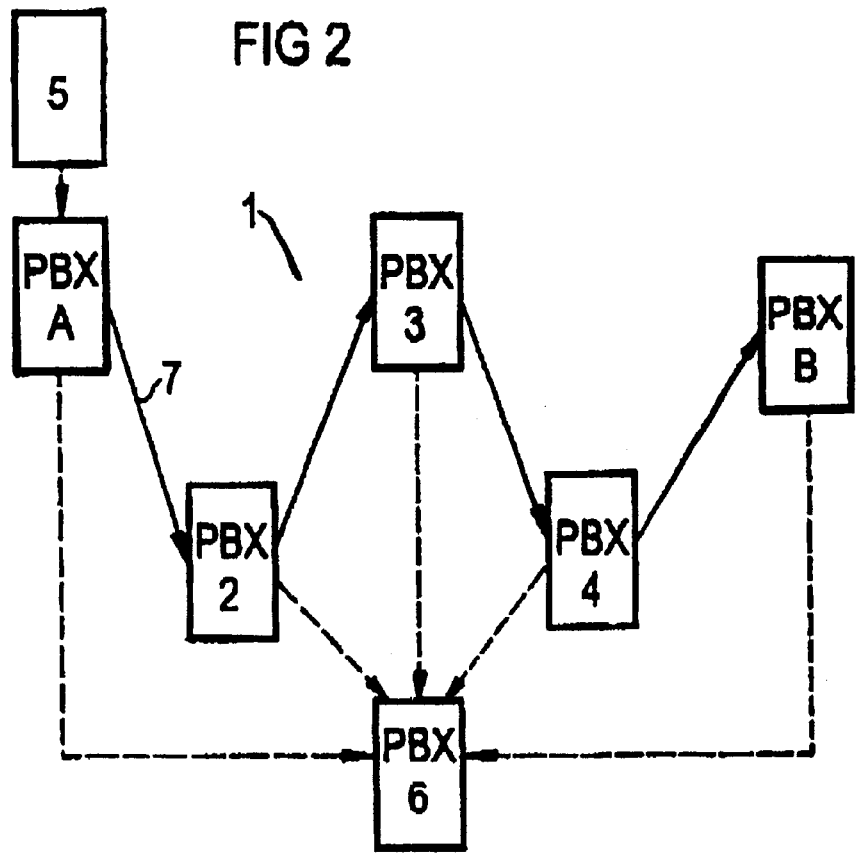

METHOD AND CONFIGURATION FOR THE NETWORK-WIDE ANALYSIS OF CONNECTIONS IN TELECOMMUNICATIONS NETWORKS

CROSS-REFERENCE TO RELATED APPLICATION

This is a continuation of copending International Application PCT/DE98/01110, filed Apr. 21, 1998, which designated the United States.

BACKGROUND OF THE INVENTION

Field of the Invention

The invention relates to a method and a configuration for the network-wide analysis of connections in telecommunications networks, in which a connection is established via at least one node of a network.

An example of a current standard for telecommunications networks is the so-called integrated services digital network (ISDN) with which a large number of services can be operated using the same network. According to the ISDN standard S0, the user information is transmitted in both directions on two base channels (B channels) at 64 kilobytes/second. In addition to the two base channels for transmitting user information, there is a control channel (D channel) with 16 kilobytes/second. In ISDN, in contrast to the conventional telephone network, the connection setup takes place from a point A to a point B on a separate control channel, namely the D channel. A terminal and a switching office communicate with one another about the type and method of character exchange using the D channel protocol. As a result, functional sequences that lead to changes in status take place in the terminal and in the switching office. The switching processes are controlled by programs and/or procedures. The transfer of parameters is carried out, for example, by use of a secured layer-2-transmission of message elements (information elements) in the layer-3-data format.

The above transmission rates are mentioned only as an example, only the division into B and D channels is significant for the present invention.

In order to analyze the functions and data of ISDN connections, it is necessary to have protocol analyzers that represent the information relating to the individual layers of the CCITT communication model.

It is known to analyze connections locally by use of so-called "tracing" methods and to collect connection-specific data relating to lines or nodes. However, the aforementioned analysis data are only local data, i.e. data that relate to the connection section between two nodes of the network.

According to the prior art, in order to analyze entirely a connection in a telecommunications network which extends over a plurality of nodes, private branch exchanges and possibly even over a plurality of carrier networks, it is therefore necessary for a service man to check each connection section between the individual private branch exchangers, carrier networks or nodes in order to be able to analyze the entire connection.

Alternatively, according to the prior art, each individual node or each individual private branch exchange of the connection can be dialed up by a modem, as a result of which it is possible to obtain from each node or each private branch exchange the local data on an individual basis, i.e. in each case only the data relating to the respective node or private branch exchange.

When necessary, the collected data are simulated in the laboratory for further investigations and adjusted.

It is clear that, in order to analyze entirely a network-wide connection which extends over a plurality of nodes or private branch exchanges, a large amount of expenditure in terms of time and costs is required to analyze individually each connection section between two nodes, and then collect the individual local data.

In the known telecommunications networks, there is therefore the problem of analyzing in a "remote" (central) fashion network-wide connections on networked telecommunications systems while they are operating, and of collecting in a "remote" fashion connection-specific data which relates to lines or nodes. This problem is encountered in particular if the connection extends over a plurality of transit private branch exchanges (PBX).

SUMMARY OF THE INVENTION

It is accordingly an object of the invention to provide a method and a configuration for the network-wide analysis of connections in telecommunications networks that overcome the above-mentioned disadvantages of the prior art methods and devices of this general type, which permit a network-wide analysis of connections in telecommunications networks beyond an individual node.

With the foregoing and other objects in view there is provided, in accordance with the invention, a method for network-wide analysis of connections in telecommunications networks, which includes setting up a connection from a point A to a point B via at least one node of a network having nodes; transferring an interrogation instruction from an interrogation point of the network to the at least one node involved in the connection; and transferring connection data relating to, in each case, one node of the network from the nodes forming the connection of the network to a receiver point in response to the interrogation instruction.

For this purpose, the invention provides a method for the network-wide analysis of connections in telecommunications networks, according to which a connection is set up from a point A to a point B via at least one node of a network. An interrogation instruction is then transferred from an interrogation point of the network to the nodes involved in the connection. In response to the interrogation instruction, at least one of the nodes of the network which are involved in the connection then transfers connection data relating to, in each case, one node of the network to a receiver.

In particular, the interrogation instruction can be transferred from the point A from which the connection is set up.

The connection data from the at least one node can be transferred to the point A, functioning as a receiver point, from which the connection is set up.

In particular, the interrogation instruction can automatically also be transferred when the connection is set up.

For example, the transfer can take place according to the ISDN standard, and the interrogation instruction can be transferred in the D channel of the ISDN standard. However, the transfer can also be carried out according to any other standard in which there is the possibility of internal communication between private branch exchanges.

The interrogation instruction can be transferred, in particular, as a so-called information element of the D channel protocol of the ISDN standard.

Alternatively, the interrogation instruction can activate, in the at least one node, the transfer of connection data to the receiver point.

The interrogation instruction can be transferred within the scope of a message for internal communication between private branch exchanges. In this case, in addition to the ISDN standard, there may also be a freely defined private network protocol if desired.

The interrogation instruction can be transferred via a plurality of nodes of the connection, the plurality of nodes then together transferring the connection data relating to them to the same receiver point.

The connection data can contain information relating to the adjacent nodes, the name of the nodes and/or a modification of a call number.

According to a further aspect of the invention, a configuration for the network-wide analysis of connections is provided in telecommunications networks. The configuration relates to a connection line from a point A to a point B via at least one node of the network. In the network an interrogation point, at which a device for transferring an interrogation instruction to the nodes involved in the connection, is provided. Furthermore, a receiver point of the network, at which a device for receiving connection data relating to, in each case, one node of the network from one or more nodes of the network in response to the interrogation instruction, is provided.

The interrogation point of the network can be the point A at which the connection line begins.

The receiver point can be provided at the point A of the network at which the connection line begins.

The device for transferring the interrogation instruction can also automatically transfer the interrogation instruction when the connection is set up.

The interrogation instruction can be provided as an information element of the D channel of the ISDN standard.

The interrogation instruction can be set up in such a way that it activates the transfer of the connection data in the at least one node.

The connection line can have a plurality of nodes that all receive the interrogation instruction and, in order to receive the connection data, each transfers the connection data relating to them to the same device.

The connection data can have information relating to the adjoining nodes, the names of the nodes and/or a modification of a call number.

Other features which are considered as characteristic for the invention are set forth in the appended claims.

Although the invention is illustrated and described herein as embodied in a method and a configuration for the network-wide analysis of connections in telecommunications networks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 a is a diagrammatic, block diagram of a configuration for a network-wide analysis of connections in telecommunications networks according to the invention, and FIG. 2 is a block diagram of a second exemplary embodiment of the configuration for the network-wide analysis.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a telecommunications network 1 that is formed by a plurality of private branch exchanges PBX A, 2, 3, 4, 6, B. The private branch exchanges PBX A, 2, 3, 4, 6, B represent node points of the network 1. Alternatively, the network 1 can also have different carriers. For this reason, the designation "node" or "transit node" should be understood within the sense of the present invention as, for example, a private branch exchange PBX or a connection point between different carrier networks.

In FIG. 1, the unbroken arrows represent a connection 7 which has been set up in the network 1. The connection 7 is set up starting from the private branch exchange PBX A. As is clear, a terminal point of the connection 7 is the node of the private branch exchange PBX B. The connection 7 does not extend directly from the private branch exchange PBX A to the private branch exchange PBX B, but rather extends over a plurality of transit nodes of the network 1. In the case illustrated, the connection line 7 extends over the private branch exchanges PBX 2, PBX 3 and PBX 4 functioning as transit nodes.

Connection data, for example a modification of a call number in the individual nodes, the names of the transit nodes, the message traffic in a node, which node is connected to which node via which line, which parameters are set in the individual nodes etc. are, as is known, available in each case only locally in each of the plurality of nodes. Therefore, for example, the node of the private branch exchange PBX 3 has only information data relating to the connection section connecting the adjacent nodes, i.e. in the node if the private branch exchange PBX 3 data are available which relate to the connection section between the node of the private branch exchange PBX 2 and the node PBX 3, as well as data which relate to connection sections between the node of the private branch exchange PBX 3 and the node of the private branch exchange PBX 4. The same applies of course to the other private branch exchanges in terms of the adjoining connection sections.

According to the invention, the individual local connection data of the individual private branch exchanges of the network 1 are then available at a receiver point, for example the node of the private branch exchange 6. For this purpose, the individual local connection data of the respective private branch exchanges are transmitted to the node of the private branch exchange 6 as the receiver point and are thus available, and can be analyzed, centrally there. For this purpose, a device for receiving the connection data is provide at the receiving point. According to the invention, connection data relating to all the connection sections forming the connection 7 are thus available at the receiver point, to be precise the node of the private branch exchange PBX 6, so that the entire connection 7 is then available, and can be evaluated, in its entirety at a central point, namely the receiver point of the node of the private branch exchange 6. A rapid central diagnosis for the purpose of analyzing the network or faults can thus be carried out at the central point.

In order to cause the individual nodes of the private branch exchanges to each transmit their local connection data to a specific receiver point PBX 6, according to the exemplary embodiment of FIG. 1 an interrogation instruction is also transferred when the connection is set up starting from the node of the private branch exchange PBX A. If a connection is set up according to the ISDN standard, the interrogation instruction can be transferred within the scope of a freely definable information element of the so-called D channel protocol of the ISDN standard. As is known, a number of information elements are provided in the D channel protocol according to the ISDN standard, a number of which elements are permanently assigned, in order, for example, to activate or deactivate certain barriers, and a number of information elements (IE) being freely definable. According to the invention, such a freely definable information element (IE) can therefore contain an interrogation instruction.

The information elements can also have more wide-ranging functions. The information can contain, for example, small procedures that bring about selective reading out of data, in which case this reading out does not have to take place during the installation of the system but is instead only carried out by the test routines of the procedures of the information elements as part of a subsequent expansion.

It is to be noted that the ISDN standard is referred to only as an example, and other standards, such as private freely definable standards, may even provide the advantage of being able to transfer, depending on the application, freely definable instructions in the form of information elements or message elements.

Within the scope of the information element, the transit nodes, in the form of the private branch exchange PBX, are informed that they have to collect their locally available data, which are associated, for example, with the corresponding connection section, and send them to a specific address of the telecommunications network 1. According to the D channel protocol of the ISDN standard, the interrogation instruction can therefore also be sent together with the customary setup message within the framework of an additional information element, the interrogation instruction specifying, for example, that in the transit nodes (PBX) all the incoming and outgoing messages which are associated with this connection or connection section are stored locally in the private branch exchanges and then subsequently sent to a specific, common receiver point, in the case illustrated, the private branch exchange 6 of the network 1, by a data transmission.

As an alternative to the above-mentioned interrogation instruction within the framework of an information element of the D channel protocol of the ISDN standard, the interrogation instruction can also trigger the following function. Even before a connection line 7 is set up in the network 1, a so-called "remote" function (central interrogation function) is programmed in the nodes of the individual private branch exchanges PBX. In such a case, all that is then necessary is for an interrogation instruction, which activates the so-called "remote" function, to be transmitted to the individual nodes in the form of the private branch exchanges PBX.

According to the first exemplary embodiment, the interrogation instruction is therefore, for example, automatically also transmitted with the connection set-up starting from the node of the private branch exchange PBX A.

FIG. 2 illustrates a further exemplary embodiment of a configuration according to the invention for the network-wide analysis of connections in telecommunications networks. As is clear in FIG. 2, the essential difference between the second exemplary embodiment and the first exemplary embodiment that is illustrated in FIG. 1 is that the interrogation instruction is not output automatically with the connection setup from the node of the private branch exchange PBX A so that instead an external interrogation point 5 is provided, i.e. a point is provided at which there is a transfer device which instructs a node of the network 1 to dispatch the interrogation instruction from a node of the network 1 or itself transmits the interrogation instruction to a node of the network 1 so that it can transfer from this node to all the other nodes of the network 1. In the example illustrated in FIG. 2, the device in the interrogation point 5 instructs the node of the private branch exchange PBX A to dispatch the interrogation instruction via the line 7.

The figures illustrate the case in which the receiver point, that is to say the point at which the individual local connection data of the respective nodes of the private branch exchanges PBX are transmitted, is not a component of the connection 7. Meanwhile, it is also possible for the receiver point to be the node of the private branch exchange PBX A from which the connection 7 is set up. Therefore, the interrogation instruction is transferred from the node of the private branch exchange PBX A to the transit nodes automatically when the connection 7 is set up. The respective nodes of the connection 7 then transfer their respective local connection data to the node of the private branch exchange PBX A, from which the connection 7 has been set up. The connection can thus be analyzed at the point from which it was set up.

The invention therefore provides a possible way of following throughout the network a connection setup or release, which can take place automatically in order to be able to rapidly acquire diagnostic data for analyzing the network or faults. The expenditure on the maintenance and analysis of telecommunications networks is thus reduced.

We claim:

1. A method for network-wide analysis of connections in telecommunications networks, which comprises:
   setting up a connection from a point A to a point B via at least one node of a network having nodes;
   transferring an interrogation instruction from an interrogation point of the network to the at least one node involved in the connection; and
   transferring connection data relating to, in each case, one node of the network from the nodes forming the connection of the network to a receiver point in response to the interrogation instruction.

2. The method according to claim 1, which comprises transferring the interrogation instruction from the point A from which the connection is set up.

3. The method according to claim 1, which comprises transferring the connection data to the point A in which the point A functions as the receiver point.

4. The method according to claim 1, which comprises transferring automatically the interrogation instruction when the connection is set up.

5. The method according to claim 1, which comprises executing the transferring step of the interrogation instruction according to an integrated services digital network (ISDN) standard, and the interrogation instruction is transferred in a D channel of the ISDN standard.

6. The method according to claim 5, which comprises transferring the interrogation instruction as an information element of a D channel protocol of the ISDN standard.

7. The method according to claim 6, which comprises providing the information element with interrogation procedures.

8. The method according to claim 5, which comprises using the interrogation instruction to activate, in the at least one node, a transfer of the connection data to the receiver point.

9. The method according to claim 5, which comprises transferring the interrogation instruction within a scope of a message for internal communication between private branch exchanges (PBX) of the network.

10. The method according to claim 1, which comprises:
   forming the connection from a plurality of the nodes;
   transferring the interrogation instruction to the plurality of nodes forming the connection; and
   transferring from the plurality of nodes forming the connection to the receiver point all the connection data relating to each node of the plurality of nodes forming the connection.

11. The method according to claim 1, which comprises forming the connection from a plurality of the nodes and the connection data for each node of said plurality of nodes contains information about at least one of adjoining nodes, names of the adjoining nodes and a modification of a call number.

12. In combination with a telecommunications network having a receiver point, an interrogation point and a connection line from a point A to a point B formed via at least one node of nodes of the telecommunications network, a configuration for a network-wide analysis of connections in the telecommunications network, the configuration comprising:
   an interrogation unit generating and transferring an interrogation instruction to all the nodes forming the connection line of the telecommunications network, said interrogation unit connected to the interrogation point of the telecommunications network; and
   a receiver unit connected to the receiver point of the telecommunications network, said receiver unit receiving connection data relating to all of the nodes of the telecommunications network forming the connection line in response to the interrogation instruction generated by said interrogation unit and received by the nodes forming the connection line.

13. The configuration according to claim 12, wherein the interrogation point of the telecommunications network is the point A at which the connection line begins.

14. The configuration according to claim 12, wherein the receiver point is provided at the point A of the network at which the connection line begins.

15. The configuration according to claim 12, wherein said interrogation unit automatically transfers the interrogation instruction when the connection line is set up.

16. The configuration according to claim 12, wherein the interrogation instruction is an information element of a D channel protocol of an integrated services digital network (ISDN) standard.

17. The configuration according to claim 16, wherein the information element contains interrogation procedures.

18. The configuration according to claim 12, wherein the interrogation instruction is set up such that it activates, in all the nodes forming the connection line, a transfer of the connection data.

19. The configuration according to claim 12, wherein the connection line is formed of a plurality of nodes all receiving the interrogation instruction and, the plurality of nodes transferring respective connection data to said receiving unit.

20. The configuration according to claim 19, wherein the connection data contains information about at least one of adjoining nodes, names of the adjoining nodes and a modification of a call number.

* * * * *

UNITED STATES PATENT AND TRADEMARK OFFICE
CERTIFICATE OF CORRECTION

PATENT NO. : 6,353,595 B1  
DATED : March 5, 2002  
INVENTOR(S) : Christian Kofler et al.

It is certified that error appears in the above-identified patent and that said Letters Patent is hereby corrected as shown below:

<u>Title page,</u>  
Item [63], should read as follows:

-- Continuation of application No. PCT/DE98/01110, filed on April 21, 1998. --

Signed and Sealed this

Tenth Day of September, 2002

Attest:

Attesting Officer

JAMES E. ROGAN  
*Director of the United States Patent and Trademark Office*

UNITED STATES PATENT AND TRADEMARK OFFICE
CERTIFICATE OF CORRECTION

PATENT NO.    : 6,353,595 B1
DATED         : March 5, 2002
INVENTOR(S)   : Christian Kofler et al.

It is certified that error appears in the above-identified patent and that said Letters Patent is hereby corrected as shown below:

<u>Title page,</u>
Item [30], should read as follows -- Foreign Application Priority Data
May 7, 1997    (DE) ..................... 197 19 447.8 --

Signed and Sealed this

Third Day of December, 2002

JAMES E. ROGAN
*Director of the United States Patent and Trademark Office*